3,799,925
TRIAZINE DERIVATIVES
Erwin Nikles, Liestal, Switzerland, assignor to Ciba-Geigy Corporation, Ardsley, N.Y.
No Drawing. Continuation of abandoned application Ser. No. 728,052, May 9, 1968. This application Jan. 14, 1971, Ser. No. 106,597
Int. Cl. C07d 55/20
U.S. Cl. 260—249.8         6 Claims

ABSTRACT OF THE DISCLOSURE

New 1,3,5-triazine compounds of the formula

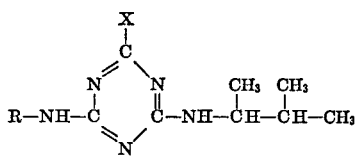

X=halogen, lower alkoxy, lower alkylmercapto,
R=lower alkyl, lower alkoxyalkyl, and their use in pesticidal preparations is disclosed.

CROSS-REFERENCE TO RELATED APPLICATION

This is a continuation of application Ser. No. 728,052, filed May 9, 1968, now abandoned.

The present invention provides compounds of the general formulae

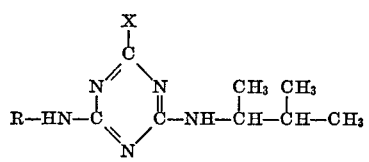

wherein X represents a chlorine atom, a methoxy- or methylmercapto group and R represents a lower alkyl or alkoxyalkyl radical.

The present invention also provides a pesticidal preparation, especially a herbicidal preparation, which comprises as active ingredient a compound of the general formula

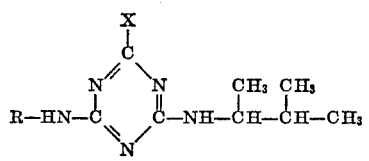

in which X represents a chlorine atom, a methoxy- or methylmercapto group and R represents a lower alkyl or alkoxyalkyl radical, together with a suitable carrier.

The present invention is based on the unexpected observation that triazine derivatives of the General Formula I display a selectivity that is superior to comparable commercial products. More especially, triazines of the Formula I may be used for controlling weeds infesting cultures of useful plants, without impairing the growth of the latter.

The new triazine derivatives can be prepared by known methods by reacting a cyanuric halide in any desired order of sequence with α,β-dimethyl-propylamine, an amine of the formula R—NH₂ and methanol or methanethiol, preferably in form of the alcoholate. Such reactions have been described fully in the literature, so that the conditions need not be discussed in detail here.

As examples of amines of the formula R—NH₂, there may be mentioned: methylamine, ethylamine, isopropylamine, secondary butylamine, β-methoxyethylamine, γ-methoxypropylamine and γ-isopropoxy-propylamine.

The preparations of this invention may be applied in widely differing forms. In the manufacture of spray solutions of the compounds of the General Formula I, there may be used, for example, petroleum fractions of high to medium boiling range, preferably above 100° C., for example, diesel oil or kerosene, coal tar oils or oils of vegetable or animal origin, as well as hydrocarbons, for example alkylated naphthalenes, tetrahydronaphthalene, if desired in combination with xylene mixtures, cyclohexanols, ketones, or chlorinated hydrocarbons, for example tri- or tetrachloroethane, trichloroethylene or tri- or tetrachlorobenzenes.

Aqueous forms of application are made, for example, from emulsion concentrates, pastes or wettable spray powders by adding water thereto. Suitable emulsifiers or dispersants are, for example, non-ionic products, for example, condensation products of aliphatic alcohols, amines or carboxylic acids containing a long-chain hydrocarbon residue of about 10 to 20 carbon atoms with ethylene oxide, for example, the condensation product of octadecyl alcohol and 25 to 30 mols of ethylene oxide, of or soybean fatty acid and 30 mols of ethylene oxide, or of commercial oleylamine and 15 mols of ethylene oxide or of dodecylmercaptan and 12 mols of ethylene oxide. Suitable anionic emulsifiers are: the sodium salt of dodecyl alcohol sulphuric acid ester, the sodium salt of dodecylbenzenesulphonic acid, the potassium or triethanolamine salt of oleic acid or of abietic acid or of mixtures of these two acids, or the sodium salt of a petroleum sulphonic acid. Suitable cationic dispersants are: quaternary ammonium compounds, for example, cetyl pyridinium bromide or dihydroxyethyl benzyl dodecyl ammonium chloride.

It is possible to prepare dusting and casting agents with the use of solid vehicles, for example, talcum, kaolin, bentonite, calcium carbonate, calcium phosphate, or coal, cork meal, wood meal or other materials of vegetable origin. It is also very advantageous to manufacture the preparation in granulated form. The various forms of the preparation may contain the usual substances that improve the adhesion, the fastness to rain or the penetration; as such substances there may be mentioned: fatty acids, resins, glue, casein or alginates.

In addition to their herbicidal properties, the compounds of the General Formula I also act as herbicides and display, for example, a microbicidal, insecticidal, acaricidal, nematocidal and molluscicidal activity. The new compounds may also be used as cotton defoliants.

The following examples illustrate the invention. Unless otherwise indicated the parts and percentages are by weight.

EXAMPLE 1

(a) 2-ethylamino-4-chloro-6-(α,β-dimethylpropylamino)-1,3,5-triazine 38 parts of aqueous ethylamine of 71% strength are added in portions to 70.5 parts of 2,4-dichloro-6-(α,β-dimethylpropylamino)-1,3,5-triazine, dissolved in 250 parts by volume of dioxane. The temperature is then allowed to rise to 56° C. The mixture is stirred for a few hours at room temperature, and then 300 parts of water are added. The precipitated product is filtered off and crystallized from acetonitrile; it melts at a temperature within the range from 129–131° C.

The 2,4-dichloro - 6 - (α,β-dimethylpropylamino)-1,3,5-triazine required as starting material is prepared thus: 460 parts of cyanuric chloride are dissolved in 2500 parts by volume of toluene, and while stirring at 0–5° C., there are added, drop by drop to this solution, 275 parts of α,β-dimethylpropylamine and then 100 parts of sodium hydroxide dissolved in 500 parts of water. The mixture is stirred at 0° C. until it displays a neutral reaction. The organic phase is separated, dried over anhydrous sodium sulphate, filtered and evaporated. The residue is crystallized from hexane. M.P. 63–65° C.

(b) 2-ethylamino-4-(α,β-dimethylpropylamino)-6-methoxy-1,3,5-triazine 73 parts of 2-ethylamino-4-chloro-6-(α,β-dimethylpropylamino)-1,3,5-triazine are added to a solution of 20 parts of sodium methylate in 250 parts of methanol. The mixture is refluxed for 14 hours and then evaporated. The residue is dissolved in 500 parts by volume of toluene and washed with water. On evaporation of the solvent, pure 2-ethylamino - 4 - (α,β-dimethylpropylamino)-6-methoxy-1,3,5-triazine is obtained.

(c) 2-(α,β-dimethylpropylamino)-4-methylamino-6-methylmercapto-1,3,5-triazine 48 parts of methylmercaptan and about 1 gram of trimethylamine are introduced into a solution of 199.5 parts of 2,4-dichloro - 6 - (α,β-dimethylpropylamino)-1,3,5-triazine in 500 parts by volume of toluene and then, while stirring at 0° C., a solution of 40 parts of sodium hydroxide in 200 parts of water is added drop by drop, and the mixture is stirred at 0° C., until it displays a neutral reaction.

The organic phase is separated, dried and evaporated. The residue is distilled in a high vacuum. The product boils at 146° C., under a pressure of 0.4 mm. Hg.

37 parts of the resulting 2-chloro-4-(α,β-dimethylpropylamino)-6-methylmercapto-1,3,5-triazine are dissolved in 100 parts by volume of toluene and, while stirring and supplying moderate cooling, 30 parts of aqueous methylamine of 32% strength are added drop by drop. The mixture is stirred for 14 hours at 40° C., and then diluted with 100 parts by volume of toluene and 100 parts of water. The organic phase is separated, dried and evaporated and the residue distilled; it boils at about 150° C. under 0.1 mm. Hg pressure. The compounds described below may be prepared in a similar manner as those described under (a) to (c) above:

2-chloro-4-(α,β-dimethylpropylamino)-6-isopropylamino-1,3,5-triazine (M.P. 169–170° C.);
2-chloro-4-(α,β-dimethylpropylamino)-6-(γ-methoxypropylamino)-1,3,5-triazine (M.P. 79–82° C.);
2-ethylamino-4-(α,β-dimethylpropylamino)-6-methylmercapto-1,3,5-triazine (B.P. 151–153° C./0.05 mm. Hg);
2-(α,β-dimethylpropylamino)-4-isopropylamino-6-methylmercapto-1,3,5-triazine (M.P. 91–93° C.);
2-(α,β-dimethylpropylamino)-4-γ-(methoxypropylamino)-6-methylmercapto-1,3,5-triazine;
2-(α,β-dimethylpropylamino)-4-methoxy-6-methylamino-1,3,5-triazine (B.P. 144–146° C./0.03 mm. Hg.);
2-secondary butylamino-4-(α,β-dimethylpropylamino)-6-methoxy-1,3,5-triazine;
2-(α,β-dimethylpropylamino)-4-methoxy-6-(γ-methoxypropylamino)-1,3,5-triazine (B.P. 158–159° C./0.2 mm. Hg);
2-chloro-4-(α,β-dimethylpropylamino)-6-methylamino-1,3,5-triazine (M.P. 116–119° C.); and
2-(α,β-dimethylpropylamino)-4-isopropylamino-6-methoxy-1,3,5-triazine (B.P. 147° C./0.03 mm. Hg).

EXAMPLE 2

In each test, 10 parts of one of the compounds of Example 1 are mixed with 10 parts of a mixture of an anionic surface-active compound, preferably the calcium or magnesium salt of monolauryl-benzenemonosulphonic acid, and a non-ionic surface-active compound, preferably a polyethyleneglycol ether of the monolauryl ester of sorbic acid, and then the mixture is diluted with xylene to give a volume of 100 cc.

The resulting clear solution was used as a spray concentrate, and could be emulsified by pouring it into water.

EXAMPLE 3

Use in the postemergent and preemergent treatment

The test plants mentioned in the following table were grown in earthenware pots in the greenhouse and, for the postemergent treatment 13 days after seeding, when the plants had developed their first to the second leaf, were treated with the compound of Example 1(a). The preemergent treatment was carried out 1 day after seeding. The amount applied was 2.0 kg. and 1 kg. respectively of the active substance of this invention.

The results are summarized in the following table.

| | Kg. of active substance per hectare used in the— | | | |
|---|---|---|---|---|
| | Postemergent treatment | | Preemergent treatment | |
| | 1.0 | 2.0 | 1.0 | 2.0 |
| Avena | 10 | 10 | 7 | 7 |
| Sorghum | 1 | 2 | 0 | 1 |
| Panicum | 7 | 8 | 6 | 6 |
| Poa | 10 | 10 | 9 | 10 |
| Dactylis | 10 | 10 | 7 | 7 |
| Calendula | 10 | 10 | 3 | 10 |
| Brassica | 10 | 10 | 10 | 10 |
| Daucus | 0 | 1 | 0 | 0 |
| Zea (maize) | 0 | 0 | 0 | 0 |
| Oryza (rice) | 4 | 4 | 0 | 0 |

NOTE.—0=no effect; 5=recovery of test plants uncertain, >5=plants partly badly damaged, partly completely dead.

The substance of this invention displays a strong herbicidal effect against numerous monocotylous and dicotylous test plants and has a good selective control effect upon sorghum, maize and carrots. Rice is likewise resistant to the substance of this invention when the latter is applied in the amounts chosen for the greenhouse test.

EXAMPLE 4

Postemergent treatment

The test plants mentioned in the following table were grown in earthenware pots in the greenhouse and 13 days after seeding, when the plants had developed the first to the second leaf, they were treated with 2-chloro - 4 - (α,β-dimethylpropylamino) - 6 - (γ - methoxypropylamino)-1,3,5-triazine. The amount applied was 5.0 kg. and 2.5 kg. respectively of the active substance of this invention.

| | Kg. of active substance per hectare | |
|---|---|---|
| | 5.0 | 2.5 |
| Sorghum | 7 | 6 |
| Panicum | 8 | 8 |
| Poa | 10 | 8 |
| Dactylis | 10 | 8 |
| Digitaria | 10 | 9 |
| Calendula | 10 | 10 |
| Brassica | 10 | 10 |
| Zea (maize) | 0 | 0 |
| Linum | 10 | 10 |
| Daucaus | 10 | 10 |

The substance of this invention displays a very broad activity spectrum towards monocotylous and dicotylous test plants. The effect against Panicum and Digitaria, without damage to the closely related culture plant Zea, deserves special mention.

What is claimed is:
1. A compound of the formula

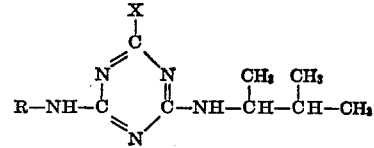

wherein X represents a halogen atom, a lower alkoxy or lower alkylmercapto radical containing 1 to 4 carbon atoms and R stands for a lower alkyl or alkoxyalkyl radical containing 1 to 4 carbon atoms.

2. A compound according to claim 1, wherein X is a chlorine, methoxy or methylmercapto radical.

3. The compound according to claim 1 wherein R is ethyl and X is methoxy.

4. The compound according to claim 1 wherein R is ethyl and X is methylmercapto.

5. The compound of claim 1 wherein R is γ-(methoxy) propyl and X is methylmercapto.

6. The compound according to claim 1 wherein R is methyl and X is methoxy.

References Cited

UNITED STATES PATENTS

| | | | |
|---|---|---|---|
| 2,891,855 | 6/1959 | Gysin et al. | 260—249.8 X |
| 2,909,420 | 10/1959 | Gysin et al. | 260—249.8 X |
| 3,326,912 | 6/1967 | Yamamoto et al. | 260—249.8 |
| 3,459,751 | 8/1969 | Nikles | 260—249.8 |
| 3,634,062 | 1/1972 | Berrer et al. | 260—249.8 X |

JOHN M. FORD, Primary Examiner

U.S. Cl. X.R.

71—93

UNITED STATES PATENT OFFICE
CERTIFICATE OF CORRECTION

Patent No. 3,799,925                    Dated March 26, 1974

Inventor(s) Erwin Nikles

It is certified that error appears in the above-identified patent and that said Letters Patent are hereby corrected as shown below:

Column 1, line 4: Change "Corporation, Ardsley, N. Y." to
-- AG, Basel, Switzerland --.

Signed and sealed this 1st day of October 1974.

(SEAL)
Attest:

McCOY M. GIBSON JR.                C. MARSHALL DANN
Attesting Officer                  Commissioner of Patents